United States Patent [19]

Haley, Jr. et al.

[11] Patent Number: 4,593,365
[45] Date of Patent: Jun. 3, 1986

[54] APPARATUS AND METHOD FOR MONITORING A PLURALITY OF FLOW METERS

[75] Inventors: John E. Haley, Jr.; Michael J. Lynch; Charles L. Mouser, all of Duncan, Okla.

[73] Assignee: Halliburton Company, Duncan, Okla.

[21] Appl. No.: 482,686

[22] Filed: Apr. 6, 1983

[51] Int. Cl.⁴ .................................... G01F 15/075
[52] U.S. Cl. .................... 364/510; 73/195; 377/21
[58] Field of Search ............ 73/195, 198; 307/200 A; 361/92; 365/228; 364/184, 464, 509, 510, 550, 200, 900; 377/21, 14; 371/66

[56] References Cited

U.S. PATENT DOCUMENTS

| | | | |
|---|---|---|---|
| 3,757,302 | 9/1973 | Pollitt | 371/14 |
| 3,895,738 | 7/1975 | Buchanan et al. | 377/21 X |
| 4,216,529 | 8/1980 | Krystek et al. | 364/510 |
| 4,247,899 | 1/1981 | Schiller et al. | 364/510 X |
| 4,262,287 | 4/1981 | McLoughlin et al. | 73/195 X |
| 4,327,410 | 4/1982 | Patel et al. | 365/228 X |
| 4,409,660 | 10/1983 | Shauger | 364/510 |
| 4,454,577 | 6/1984 | Costantini et al. | 364/900 |

Primary Examiner—Errol A. Krass
Assistant Examiner—Edward R. Cosimano
Attorney, Agent, or Firm—James R. Duzan; E. Harrison Gilbert, III

[57] ABSTRACT

A microprocessor controlled apparatus monitors a plurality of flow meters for computing and displaying the flow rates detected by each flow meter, the total volumes accumulated through each flow meter, the sum of the current flow rates for the flow meters, and the sum of the total volumes for the flow meters. The information from which the computations are made and the system operating parameters are transferred to a non-volatile memory in response to electronic means for detecting when a power outage or interruption occurs.

6 Claims, 13 Drawing Figures

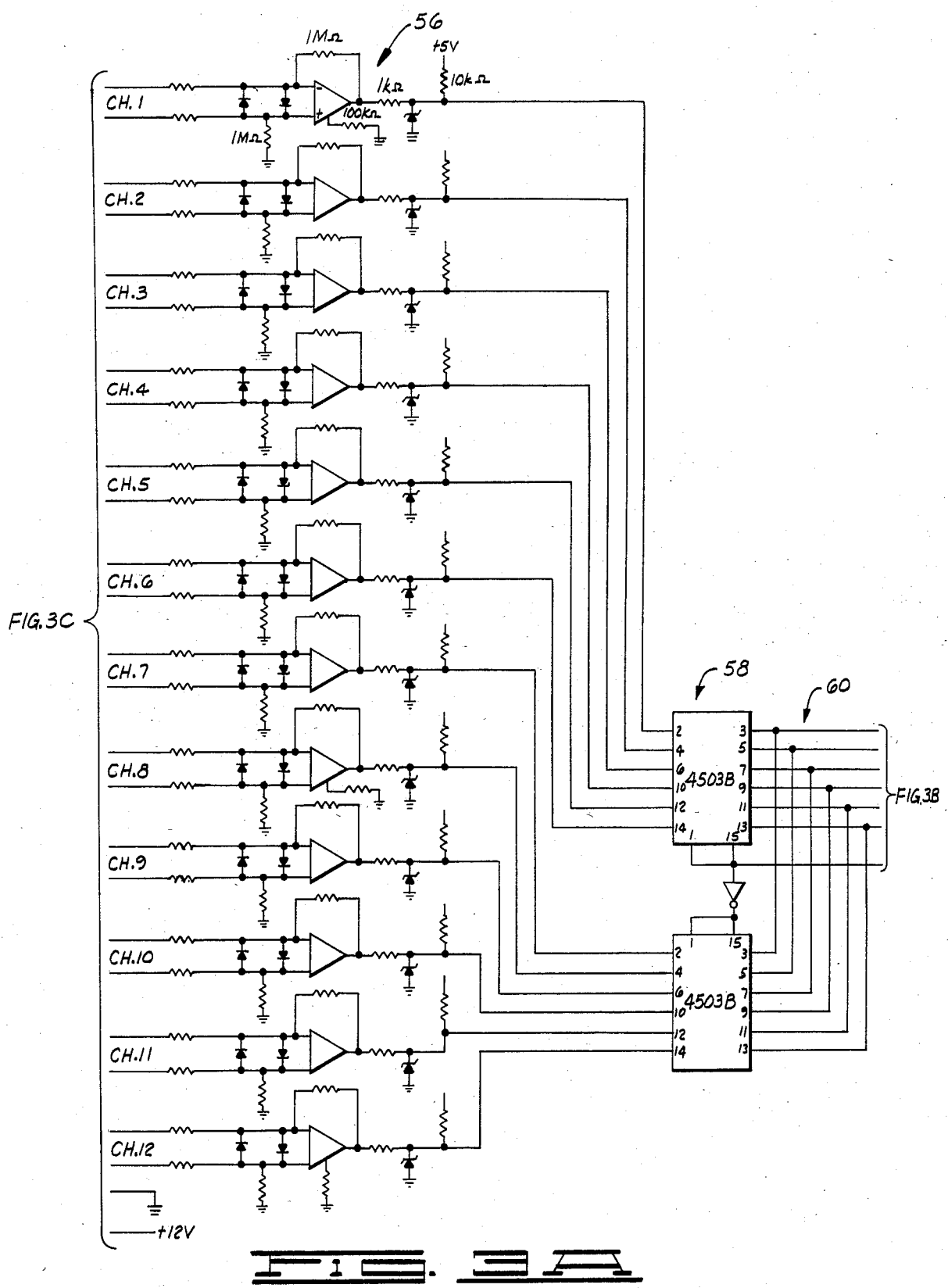

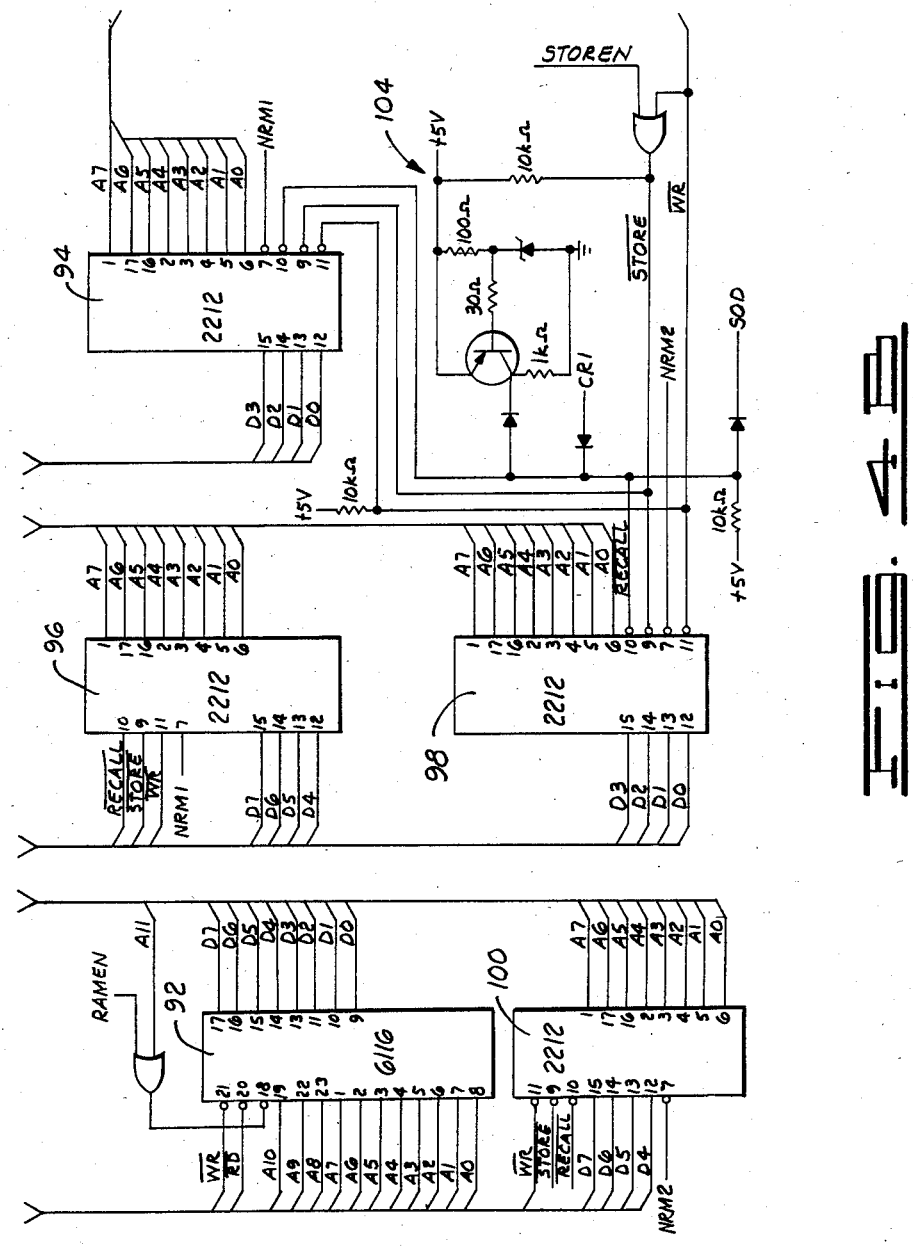

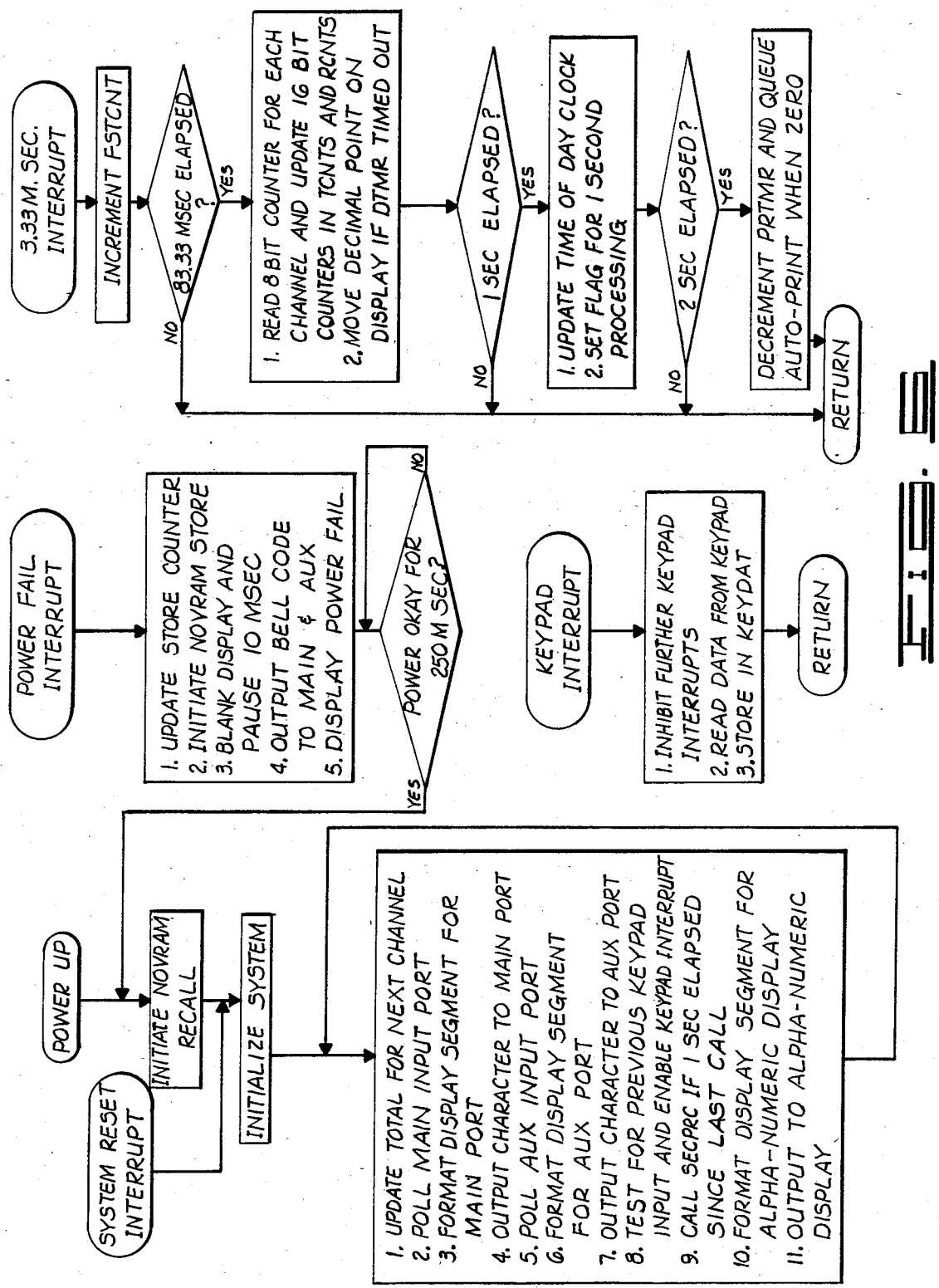

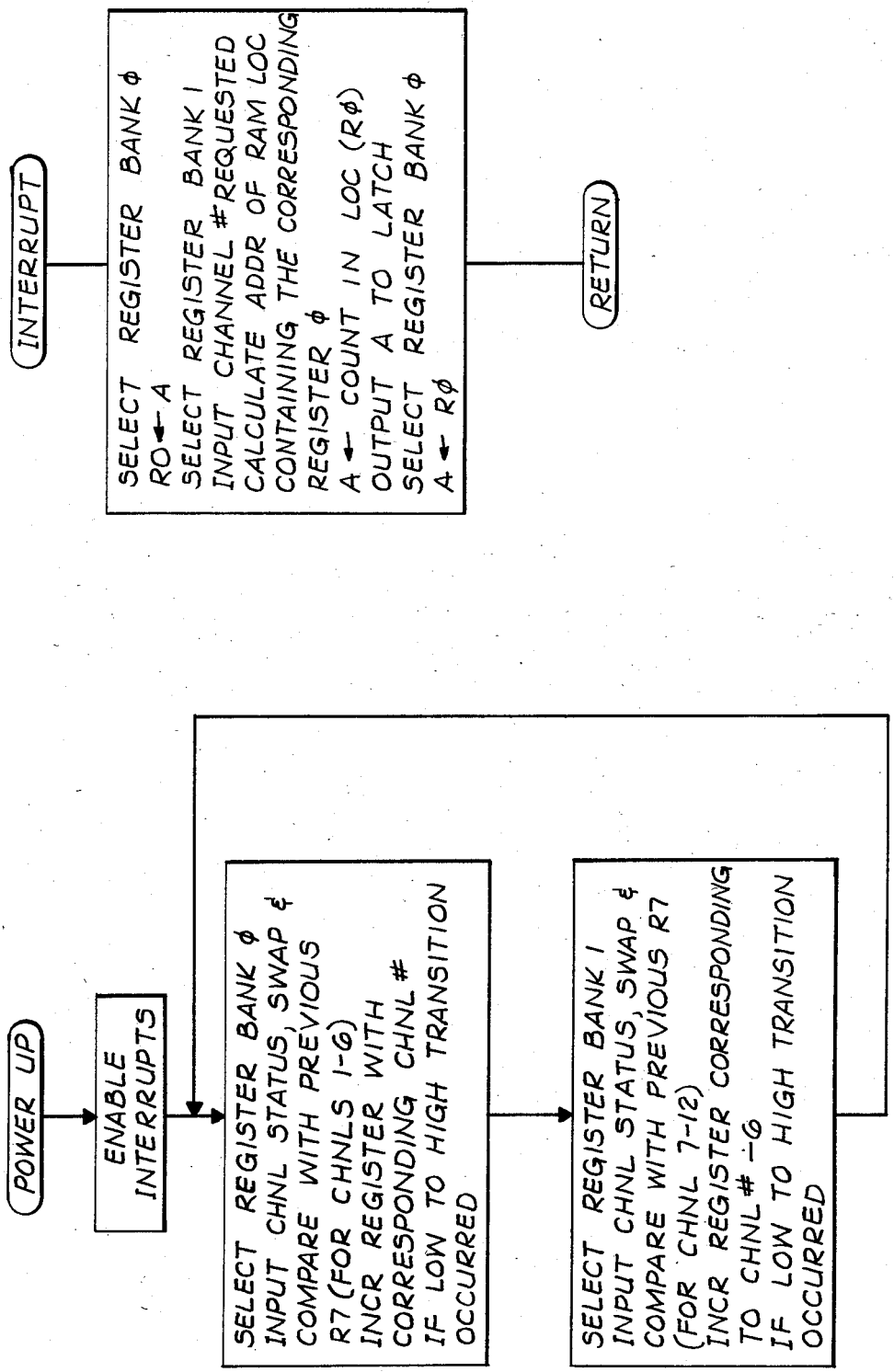

APPARATUS AND METHOD FOR MONITORING A PLURALITY OF FLOW METERS

BACKGROUND OF THE INVENTION

This invention relates generally to apparatus and methods for monitoring a plurality of flow meters and more particularly, but not by way of limitation, to an apparatus and method for computing the average flow rates and total flows, or volumes, for individual flow meters and the sums of these rates and totals for a plurality of flow meters.

In the oil and gas industry flow meters are used at a well site to monitor flows of fluid. Frequently, several flow meters must be used simultaneously. For example, several flow meters are needed to detect and measure several flows of fluids used in water flood or $CO_2$ procedures of secondary or tertiary recovery operations.

It is, of course, known that electronic equipment can be used to monitor signals generated by flow meters and to compute the instantaneous or the average flow rates represented by the signals. However, we are unaware of any microcomputer-controlled apparatus or method for continually monitoring a plurality of flow meters at a well site and providing displays of the average flow rate of each flow meter and of the sum of the average flow rates of all the monitored flow meters and of the total volumes measured for each individual flow meter and for all of the flow meters, while also retaining, without the use of a reserve electrical power supply, such information for long periods of time after power interruptions or outages occur. Because of the large number of flow meters which may be used at a well site and the possibilities for power interruptions or outages at the well site, there is the need for such an apparatus and method to quickly apprise the well site personnel of the current and historical status of each flow meter and the collection of flow meters and to retain such information for subsequent use by the well site personnel after power is restored.

SUMMARY OF THE INVENTION

The present invention provides such a novel and improved apparatus and method. The present invention monitors a plurality of flow meters and computes the current average flow rate of each flow meter, the total volume of each flow meter, and sums of the current average flow rates of all the flow meters and of the total volumes for all the flow meters. In the event of a power outage or interruption, the present invention retains this information in a non-volatile digital memory despite the lack of a backup power supply.

In a preferred embodiment of the present invention, the apparatus and method also compute the aforementioned sums for one less than all of the flow meters. This feature is useful, for example, in the event one of the flow meters is used as a master to which the other flow meters are to be compared. The preferred embodiment also enables the well site personnel to view the flow rates with selectable time bases to determine the rates on a per minute, per hour or per day basis. Still further, the preferred embodiment has pass code protection which prevents use of the invention by unauthorized personnel.

The apparatus of the present invention broadly includes receiver means for receiving respective electrical signals from individual flow meters and for conditioning the electrical signals into corresponding digital signals having numbers of pulses proportional to the flow rates detected by each flow meter. The apparatus also includes counter means for repeatedly polling all the flow meters and for counting and storing in a respective one of a plurality of storage locations the count of pulses of the digital signals detected for each of the flow meters during the last one, or most recent, of the pollings. The apparatus also broadly includes calculator means, responsive to the counts contained in the storage locations, for determining for each flow meter individual flow rates over a set, or predetermined, number of times the counter means polled the receiver means and for determining for each flow meter the total volume for a timer prior to and including the time the counter means last polled the receiver means and for further determining the sum of the individual flow rates and the sum of the total volumes. This information is ordinarily retained in a volatile memory means of the present invention and is displayable by suitable display means of the present invention.

The apparatus also broadly includes means for applying power to the apparatus, detector means for detecting when the power applied to the apparatus is interrupted, non-volatile memory means for retaining electrically encoded data without the continued application of electrical power, and means, responsive to the detector means, for transferring to the non-volatile memory means the information contained in the volatile memory means, which transferring occurs after the detector means detects a power interruption.

The method of the present invention carried out by the aforementioned apparatus includes utilizing the aforementioned pulses of the digital signals to create counts which are accumulated in respective storage locations and subsequently used to determine the various individual and summed flow rate and total volume information.

Therefore, from the foregoing, it is a general object of the present invention to provide a novel and improved apparatus and method for monitoring a plurality of flow meters. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 3A-3C are schematic circuit diagrams of one of the totalizer cards shown in FIG. 2 and the flow meter input circuits thereto. FIGS. 4A-4C are schematic circuit diagrams of the CPU/memory card shown in FIG. 2.

FIGS. 5A-5C are schematic circuit diagrams of the I/O display card shown in FIG. 2.

FIG. 6 is a flow chart of the preferred embodiment computer program which controls the operation of the microcomputer contained on the CPU/memory card shown in FIG. 2.

FIG. 7 is a flow chart of the preferred embodiment computer program which controls the operation of the microcomputer contained on each of the totalizer cards shown in FIG. 2.

DETAILED DESCRIPTION OF THE PREFERRED EMBODIMENT

With reference to the drawings, an apparatus 2 constructed in accordance with the preferred embodiment of the present invention will be described.

Figure 1:
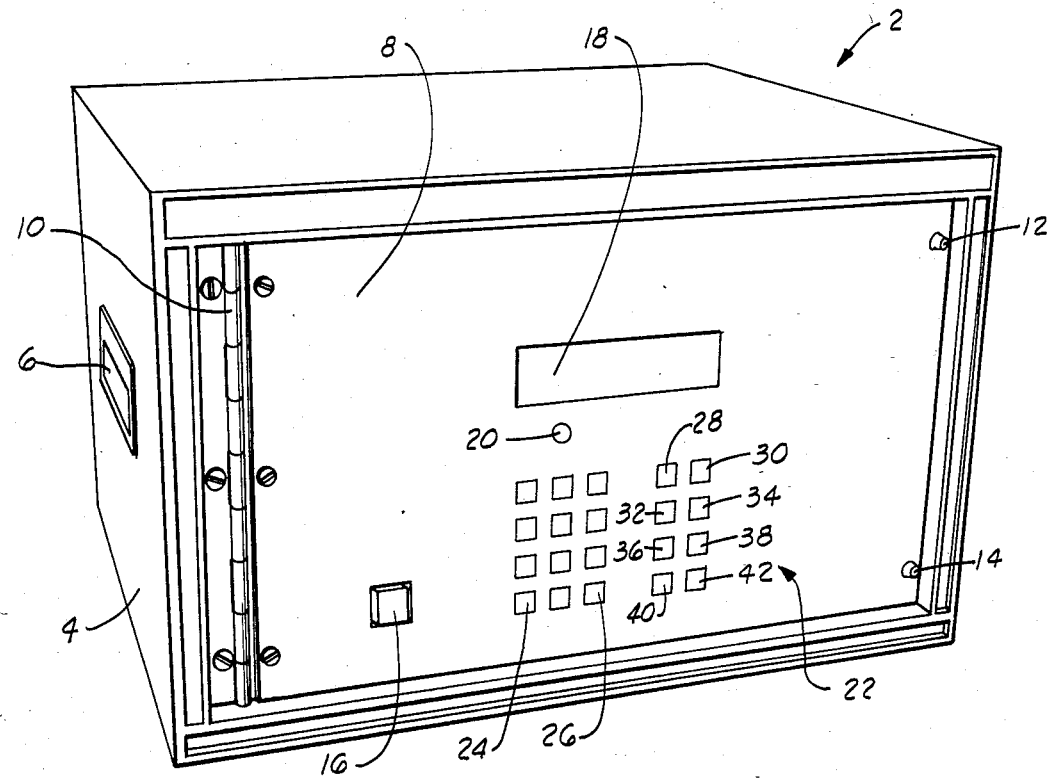
FIG. 1 is a perspective illustration of the exterior of a container of the apparatus constructed in accordance with a preferred embodiment of the present invention.

The apparatus 2 is shown in FIG. 1 to include a housing 4 which is portable, such as by side handles 6. The housing 4 includes a front panel 8 connected by a hinge 10 to the remainder of the housing 4. This hinged connection permits the front panel 8 to be swung from the closed position illustrated in FIG. 1 to an open position whereby the interior of the housing 4 can be accessed. The front panel 8 is retained in its closed position by means of screws 12, 14. The housing 4 is of such a size that it can be placed on a table top, for example.

Associated with the front panel 8 is a power switch 16 through which power can be applied to the electrical components of the apparatus 2. In the preferred embodiment power is to be provided from an ordinary 110-volt AC power supply to which the apparatus 2 is connectible by means of a polarized plug and cord (not shown).

Also associated with the front panel 8 is a 16-character alphanumeric light-emitting diode (LED) read-out or display 18. Disposed beneath the display 18 and also associated with the front panel 8 is a power failure indicator comprising a light-emitting diode 20.

Still further associated with the front panel 8 is a keypad 22. The keypad 22 includes ten keys, each representing a respective one of the digits zero through nine. The keypad 22 also includes a key 24 for entering an increment command and a key 26 for entering a decrement command. A rate/total key 28 enters a command to display either the individual rate or the total volume; a minute/hour/day key 30 is provided for entering a command designating in which time base the information is to be displayed; a sum key 32 is used for entering a command by which the sum of either the individual flow rates for all the flow meters or the sum of the totals of the flow meters is displayed. Also included in the keypad 22 is a date key 34 which causes the apparatus 2 to display the date and time of day. A function key 36, an enter key 38, and a return key 40 are provided for entering variable information and for correcting improper entries. The keypad 22 also includes a print key 42, the activation of which results in a printout if a printer is connected to the apparatus 2. Each of the keys of the keypad 22 includes a switch whereby depression of a key actuates the switch to generate a suitable function select signal. The functions of the aforementioned keys will be more particularly described hereinbelow with reference to the operation of the apparatus 2.

Figure 2:
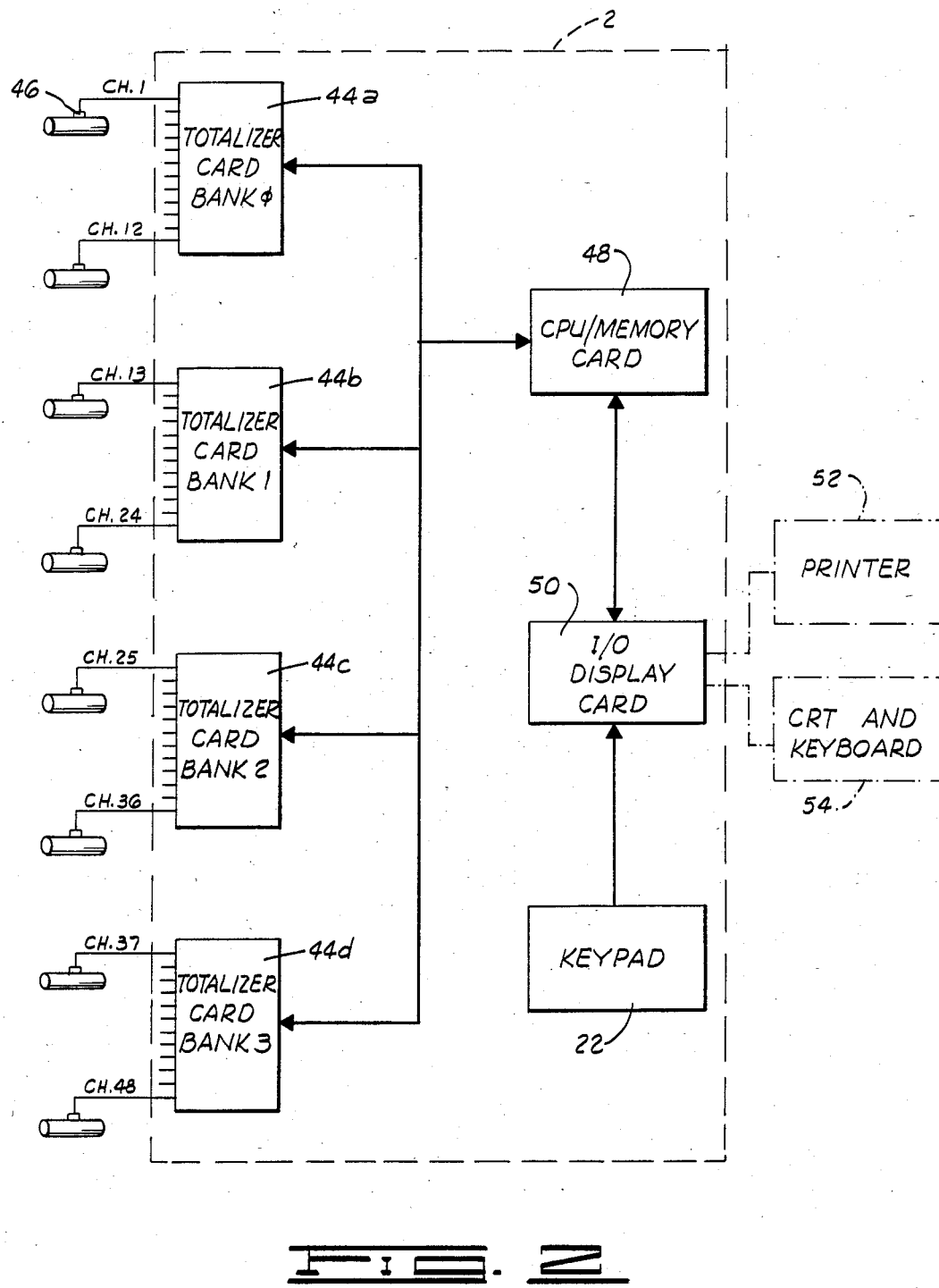
FIG. 2 is a functional block diagram of the apparatus constructed in accordance with the preferred embodiment of the present invention.

Mounted behind the front panel 8 for protective containment within the housing 4 are a plurality of printed circuit cards containing the electronic elements of the apparatus 2. These printed circuit cards are represented in FIG. 2.

These printed circuit cards include from one to four totalizer cards 44a, 44b, 44c, and 44d, which cards are rackmountable. Each totalizer card of the preferred embodiment acts as a data concentrator to poll each of twelve channels, each of which channels is associated with a respective one of twelve flow meters 46. In the preferred embodiment, each flow meter 46 is a variable reluctance turbine flow meter of a type known to the art. These flow meters generate low level analog signals which provide the inputs to the totalizer cards. These inputs are used to increment respective counters for each detected pulse of the input signal. In the preferred embodiment, from one to four of the totalizer cards can be used whereby the number of channels monitorable can be expanded from a maximum of twelve channels when only one card is used to a maximum of forty-eight channels when all four cards are used.

The printed circuit cards also include a central processing unit (CPU)/memory card 48 which is rackmountable and which contains the master microcomputer that calculates rates, totals and sums of the information obtained from the monitored flow meters. This card also contains the non-volatile memory elements of the present invention.

Another of the cards is the input/output (I/O) display card 50 which contains the circuitry for providing the electrical interface with the display 18 and the keypad 22 associated with the front panel 8. The I/O display card 50 circuitry also provides the interface with serial communication devices, such as a printer 52 and/or a CRT and keyboard 54.

The totalizer card 44a, the CPU/memory card 48, and the I/O display card 50 will next be described with reference to FIGS. 3A-3C, FIGS. 4A-4C and FIGS. 5A-5C, respectively. It is to be noted that each of the totalizer cards 44a-44d has the same components; therefore, only a description of the first totalizer card 44a will be given.

The totalizer card 44a includes receiver means for receiving the respective electrical signals from each of the flow meters 46 connected to the respective channels. The receiver means also conditions the electrical signals into corresponding digital signals having numbers of pulses proportional to the detected flow rates. The preferred embodiment of the receiver means is shown in FIG. 3A to include a plurality of differential amplifier means 56 for converting the low level analog signals from the flow meters to TTL-compatible digital square wave signals, which square wave signals include numbers of pulses whose frequencies are proportional to the detected flow rates. Each of the differential amplifier means is used to define a respective channel as indicated by the designations in FIG. 3A. Each of these channels is connectible to a flow meter by means of the interface circuitry shown in FIG. 3C.

The circuitry shown in FIG. 3C permits each flow meter to be used with or without an external preamplifier, depending upon how the terminals shown in FIG. 3A are connected by jumpers. For example, channels 1-11 shown in FIG. 3C have jumpers in place for operation without a preamplifier; whereas, channel 12 shown in FIG. 3C includes jumpers in place for operation with a preamplifier. When a flow meter is directly connected to a respective channel, the two signal leads of the flow meter are attached to the designated channel terminals and the shield lead of the flow meter is connected to the associated ground terminal which is shown to be shared by two flow meters. In the preferred embodiment, up to twelve flow meters can be connected in this manner to a single totalizer card.

The receiver means of the totalizer card 44a also includes data selector means 58 for simultaneously selecting the digital signals from a selected one of two groups of the channels. In FIG. 3A, the data selector means 58 is shown to include two integrated circuit chips, each of which has inputs which are associated with a respective group of six of the differential amplifier means 56. In particular, one of the chips has six inputs, each of which is connected to a respective one of the first six channels shown in FIG. 3A; the other of the chips has six inputs, each of which is connected to a respective one of the second six channels shown in FIG. 3A. The data selector means 58, upon a suitable control signal being received, connects one group of inputs to output lines 60 and thereby transfers either one or the other of the groups of six inputs and any associated signals to the output lines 60.

The output lines 60 are connected as inputs to a counter means for repeatedly polling the channels of the receiver means and for counting and storing in a respective one of a plurality of storage locations of the counter means the count of pulses within each of the digital signals transmitted through each of the channels during the last polling. In the preferred embodiment shown in FIG. 3B, the counter means includes a microcomputer 62 which controls the data selector means 58 to periodically connect either the first group of six channels or the second group of six channels to the inputs of the microcomputer 62 for incrementing counts stored within memory locations of the microcomputer 62. This control is effected by a data select signal generated by the microcomputer 62 and transmitted to the data selector means via a conductor 64.

The microcomputer 62 is connected to an STD bus for communication with the CPU/memory card 48. Interfacing between the microcomputer 62 and the data lines of the STD bus is effected by means of an input buffer 66 and an output buffer 68 shown in FIG. 3B. Through this type of connection, the microcomputer 62 appears as a peripheral device to the CPU/memory card 48. The address of this peripheral device is established and decoded by circuit means 70 shown in FIG. 3B. The specific address is set in the circuit means 70 by suitable jumper connections between the illustrated terminals as known to the art.

Figure 3B:
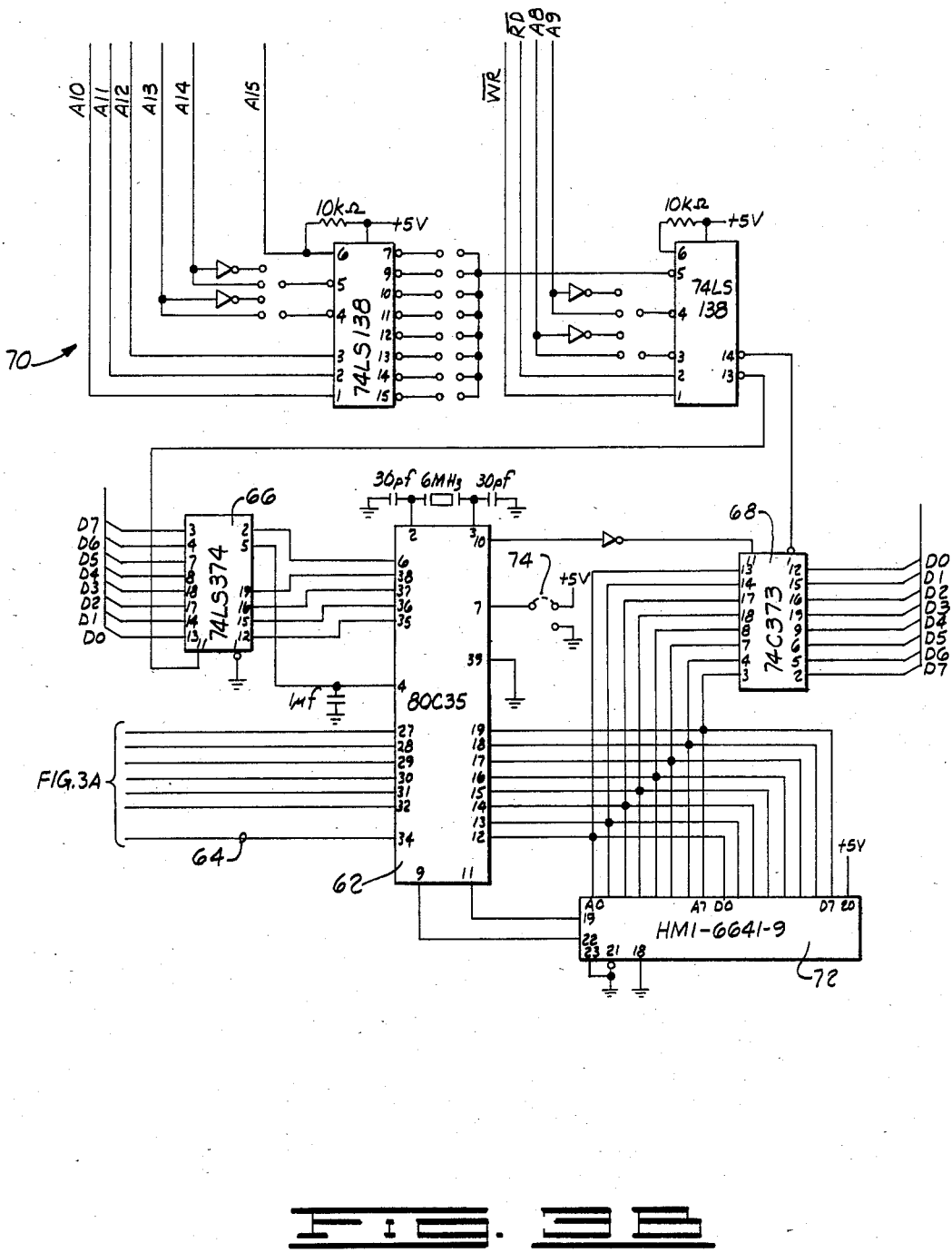
Figure 3B:
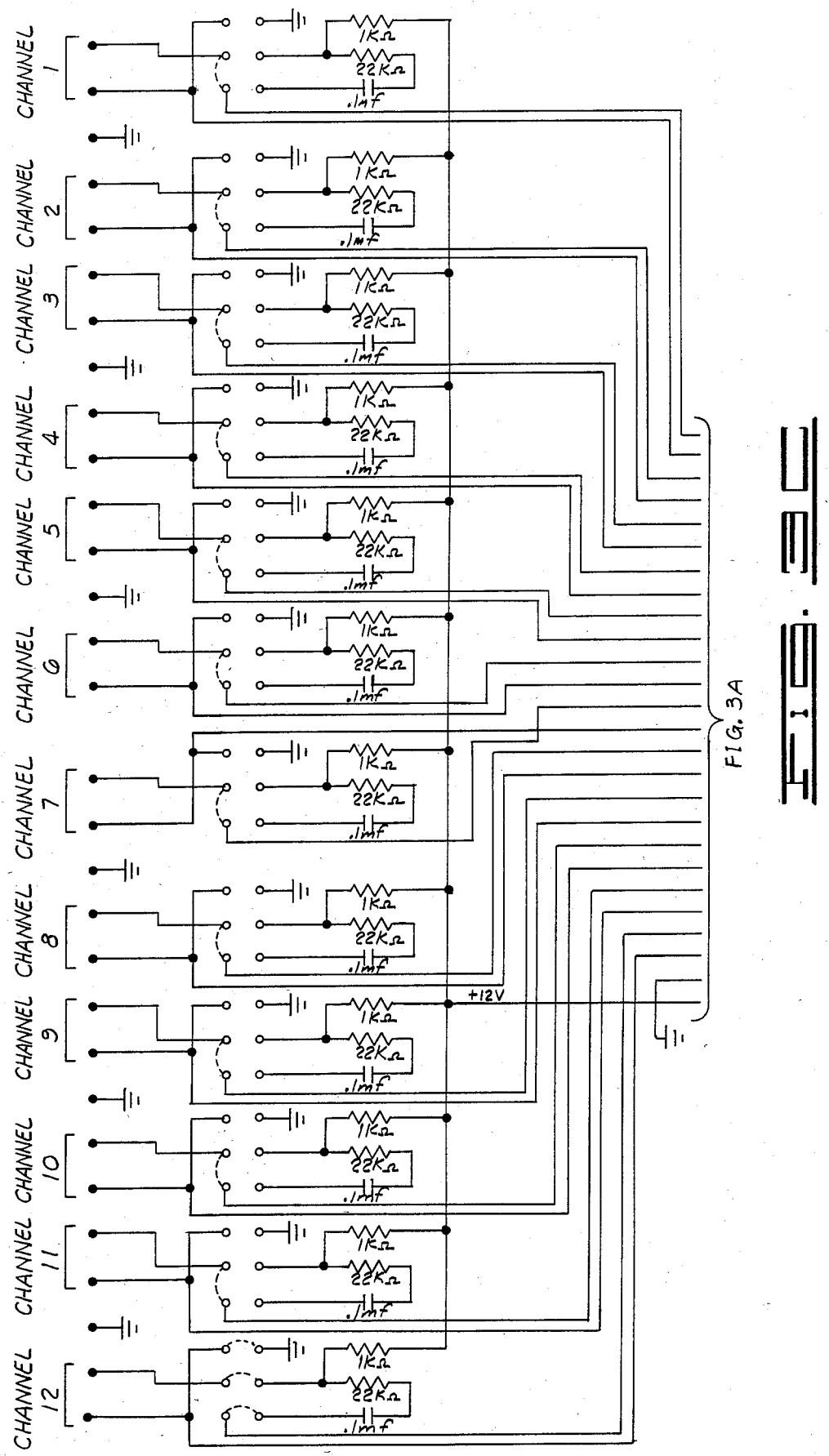

The program for controlling the operation of the microcomputer 62 is contained in a programmable read only memory (PROM) 72 shown in FIG. 3B. A flow chart of the program contained within the PROM 72 is set forth in FIG. 7. The program directs the microcomputer 62 to operate in two modes. In the first, or mainline, mode the microcomputer 62 polls the twelve input channels and increments a respective internal 8-bit counter for each positive transition detected in the input signal. In the second, or interrupt, mode the microcomputer 62 transfers the contents of the counter for a particular channel in response to a request, via interrupt, from the CPU/memory card 48.

In the preferred embodiment, the mainline mode is designed to poll the twelve channels at a rate between 7.4 kilohertz and 9.5 kilohertz except when an interrupt occurs, whereby the rate is reduced to between 4.9 kilohertz and 5.8 kilohertz. The interrupt from the CPU/memory card 48 is designed to allow only one interrupt per 205 microseconds to insure the microcomputer 62 can complete a full poll cycle. Each poll cycle consists of two parts, the first part being used to update the counters for the first group of six channels and the second part being used for updating the counters for the second group of six channels.

The counters which are updated include two banks of eight registers. Registers one through six of a bank store the counts from the six channels of the associated group of channels, and register seven is used to save the status signal for the associated group of six channels. Register zero is used to save the contents of the accumulator and to compute the internal random access memory address for the channel requested by the CPU/memory card 48.

The interrupt mode is invoked by a request from the CPU/ memory card 48 at a rate of twelve groups of twelve interrupts each second in the preferred embodiment. In the interrupt mode the channel number latched by the CPU/memory card 48 is read and the count for that channel latched onto the data bus via the buffer 68 within 62.5 microseconds.

Although the microcomputer 62 is shown in FIG. 3B to be an 80C35 microcomputer, it is also contemplated that an 80C48 microcomputer can be utilized, thereby eliminating the need for the PROM 72. To use the 80C48, a jumper 74 is connected to the ground terminal instead of the +5-volt terminal. Of course, other suitable devices can be used.

The CPU/memory card 48 includes calculator means for determining, for each channel, individual flow rates of the substances flowing by each flow meter and for determining, for each channel, the total volume of the respective flow for a time prior to and including the time the counter means last polled the receiver means and for determining, for all the channels, the sum of the individual flow rates and the sum of the total volumes. In the preferred embodiment the calculator means includes a microcomputer comprising a microprocessor 76 and associated memory (see FIGS. 4A–4C). The microcomputer periodically polls the totalizer cards, computes the flow rates and total volumes for the individual channels and the sums of the flow rates and total volumes for the individual channels, processes data for display, and initiates the store of data to a non-volatile memory within the associated memory when a power interruption or outage occurs.

Figure 4C:
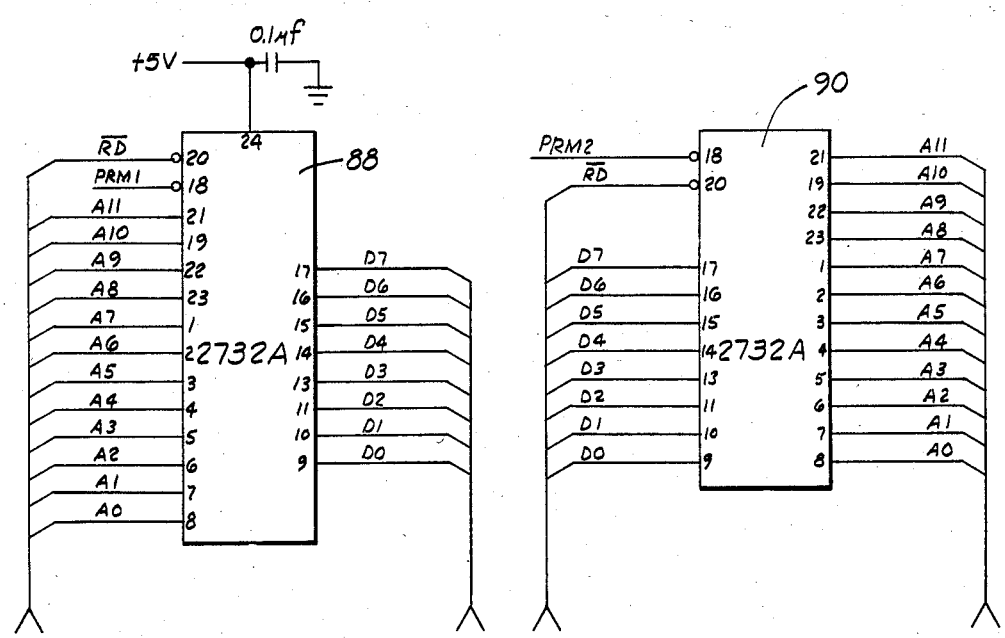
Figure 4A:
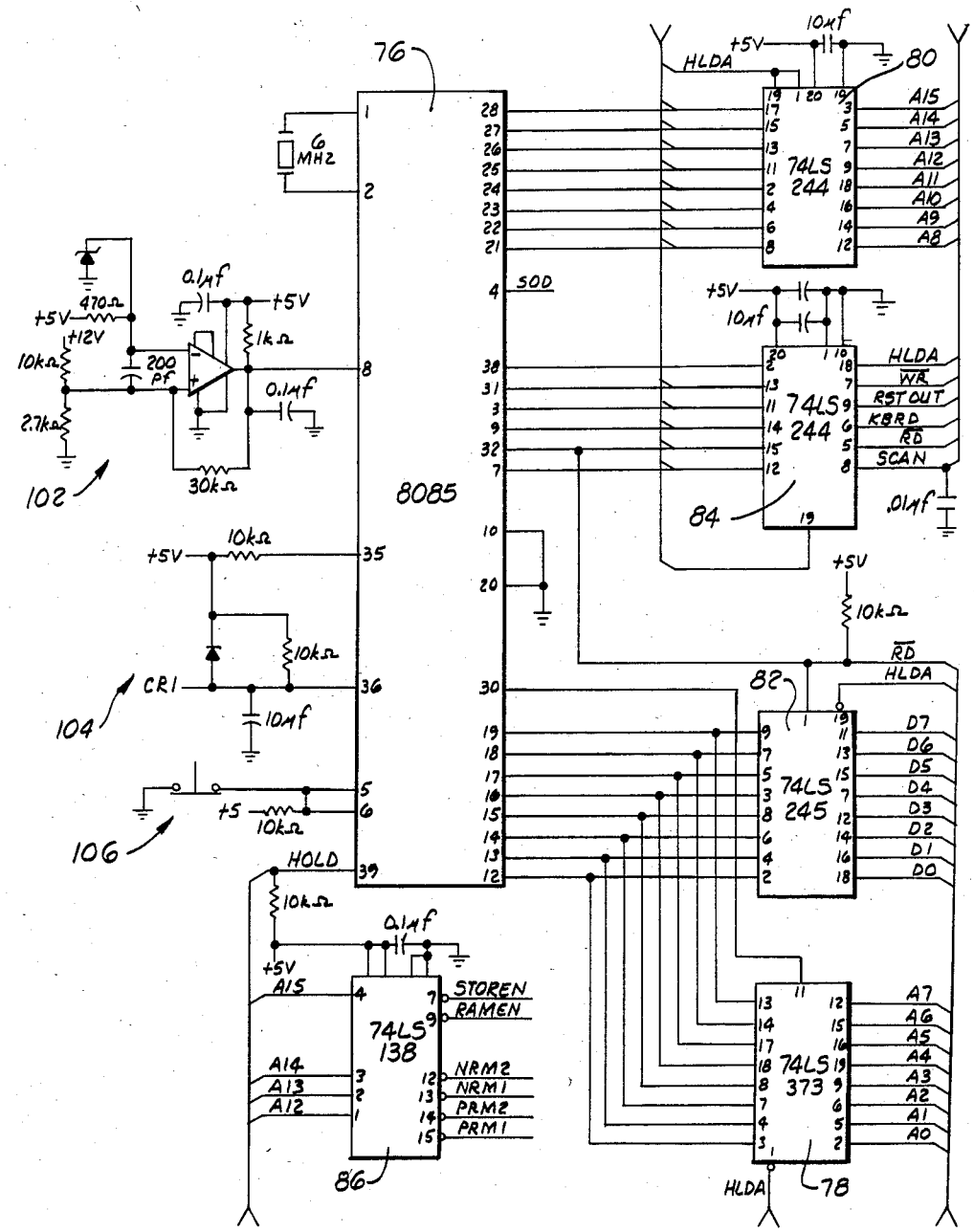

The microprocessor 76 of the preferred embodiment is shown to include an 8085 microprocessor which communicates over an STD bus via 16-bit address buffer chips 78, 80, a bi-directional data bus buffer chip 82, and a control signal output buffer chip 84 as shown in FIG. 4A. FIG. 4A also discloses that a demultiplexer chip 86 is used as an address decoding mechanism.

The memory associated with the microprocessor 76 is shown in FIGS. 4B and 4C. FIG. 4B discloses a volatile random access memory (RAM) chip 92 for providing 2048 storage locations for the program variables and processor stack.

FIG. 4B also shows four non-volatile random access memory (NOVRAM) chips 94, 96, 98, 100 for providing 512 non-volatile storage locations in which the contents are stored when a power interruption or outage is detected. The NOVRAM chips 94–100 require no battery backup to retain the information once the store sequence thereof has been completed. Each NOVRAM chip has a volatile random access memory section and a non-volatile random access memory section. Information used by the microprocessor 76 is ordinarily (i.e., under normal operating circumstances with appropriate power applied to the device) stored within the volatile section; however, this information is transferred to the non-volatile section when the aforementioned power failure or outage is detected.

FIG. 4C discloses two erasable programmable read only memory (EPROM) chips 88, 90 which provide an 8K memory for holding the operating programs and constants of the preferred embodiment.

A flow chart of the operating system contained in the EPROM chips 88, 90 is shown in FIG. 6. This system controls the microprocessor 76 to function in two modes, the background processing mode and the interrupt processing mode. The background processing mode includes polling the totalizer cards, updating the totals for each channel when additional counts are received from the totalizer cards, calculating the flow rates, processing inputs from the keypad 22 and other devices connected to the I/O display card 50, and formatting and outputting information to the devices connected to the I/O display card 50. The interrupt mode performs those functions which must be handled on an immediate or timely basis, such as power fail shutdown processing, interval timing, and keypad inputting.

The background processing generally performs all functions not handled by the interrupt processing mode. The background processing mode is designed to operate in a polled manner wherein signals are checked to see when various tasks need to be performed. Interrupts are left enables throughout most of the background processing mode except during critical periods, such as when a multi-byte total volume is being updated. On power-up or manual resetting of the apparatus 2, the background processing performs the tasks necessary for system initialization and then operates in a polled mode to perform the following functions:

1. Update total for next channel. This function examines the contents of a 16-bit counter for the next channel, which 16-bit counter is one of several such counters the microcomputer of the CPU/memory card 48 maintains in the RAM 92 for storing cumulative pulses for each channel. If the counter is zero, the channel number is incremented and no further processing is required. Otherwise, interrupts are disabled, the contents are moved to temporary storage, the counter is reset to zero and interrupts are enabled. Any previous remainder for the channel, which remainder is obtained from the NOVRAM, is added to the count saved in temporary storage and the result is compared with a divisor for the particular channel, which divisor is stored in table KTBL defined in the NOVRAM's 94–100. If the result is less than the divisor, the value is stored as the new remainder for the channel in a table TTBL of the NOVRAM's 94–100 and no further immediate processing is required for that channel. If the result is not less than the divisor, the result is divided by the divlsor to obtain the number of whole units and new remainder. The number of whole units is converted from binary to packed decimal, interrupts are disabled, the packed decimal value is added to the packed decimal total for the channel maintained in the table TTBL, the remainder from the device is stored in table TTBL, and the interrupts are enabled.

The divisor for a channel represents the number of pulses of the respective conditioned flow meter signal that constitutes a whole unit of volume. The divisor is determined by the flow meter calibration factor and the appropriate conversion factor for the desired units of registration. For example, suppose the calibration factor for a flow meter is 55.2 pulses per gallon and the desired unit of registration is barrels, then the divisor is 2,318 pulses per barrel (55.2 pulses/gallon × 42 gallons/barrel = 2,318.4 pulses/barrels — fraction rounded to the nearest whole number).

2. Poll main serial communication port for input. This function tests for a key actuation on a CRT plugged into a main serial communication port described hereinbelow with reference to FIG. 5C. If a key has been depressed, the ASCII code is input and the input processed.

3. Format display segment for main serial communication port. This function tests for an output buffer maintained within the microcomputer of the CPU/memory card 48 being empty. If the buffer is empty, the next output line for the CRT is formatted.

4. Output character to main serial communication port. This function checks to determine if a transmitter buffer maintained within the microcomputer of the CPU/memory card 48 is empty, if a data terminal ready signal is present, and if data are formatted for output. If all these conditions are true, the next character is output to the main port and the buffer address pointers are updated.

5. Poll auxiliary serial communication port for input. This function tests for data entered on a CRT plugged into an auxiliary serial communication port described hereinbelow with reference to FIG. 5C. If data are entered, the ASCII code is input and processed.

6. Format display segment for auxiliary serial communication port. This is similar to the format display segment for the main communication port.

7. Output character to auxiliary serial communication port. This function is similar to the output character to main communication port function.

8. Process keypad input. If a keypad key has been depressed, the key entry is saved before unconditionally enabling the keypad interrupts. The key input is translated and processed.

9. One second timing. If a software-maintained "one second elapsed" flag is set, this function resets the flag decrements pass code timers by one if they are not zero, and resets a software-maintained "second timer" flag for each device.

10. Format character string for 16-character alphanumeric display. If the display 18 is not in a rippling decimal point mode (subsequently described), this function formats the latest flow rate, the total, the sums, or the date/time for display.

11. Output character string to alphanumeric display. If the display is not in the rippling decimal point mode, this function outputs a character string previously formatted for display.

When a flow rate is to be displayed, the number of fractional digits to be displayed is determined by the time base and magnitude of the divisor. Flow rates are calculated based on the number of pulses detected in 3.75 seconds for units per minute and the number of pulses detected in thirty seconds (the last eight 3.75 second intervals) for units per hour and units per day. For flow rates greater than 99,999 units per minute, 999,999 units per hour or 9,999,999 units per day, the word OVERFLOW is displayed and the flow rate for that channel is not included in the sum of flow rates. When the sum of rates is displayed as a 16-character string, an asterisk in the sixteenth character indicates a channel has been excluded from the sum either due to an overflow condition or a channel being selected for exclusion, which excluded channel can be manually selected via the keypad 22 as subsequently described.

In the interrupt processing mode of the microcomputer of the CPU/memory card 48, there are four interrupts serviced by the microprocessor 76. These interrupts are designated "keypad interrupt," "power fail interrupt," "3.33 millisecond interrupt," and "system reset interrupt."

Figure 5B:
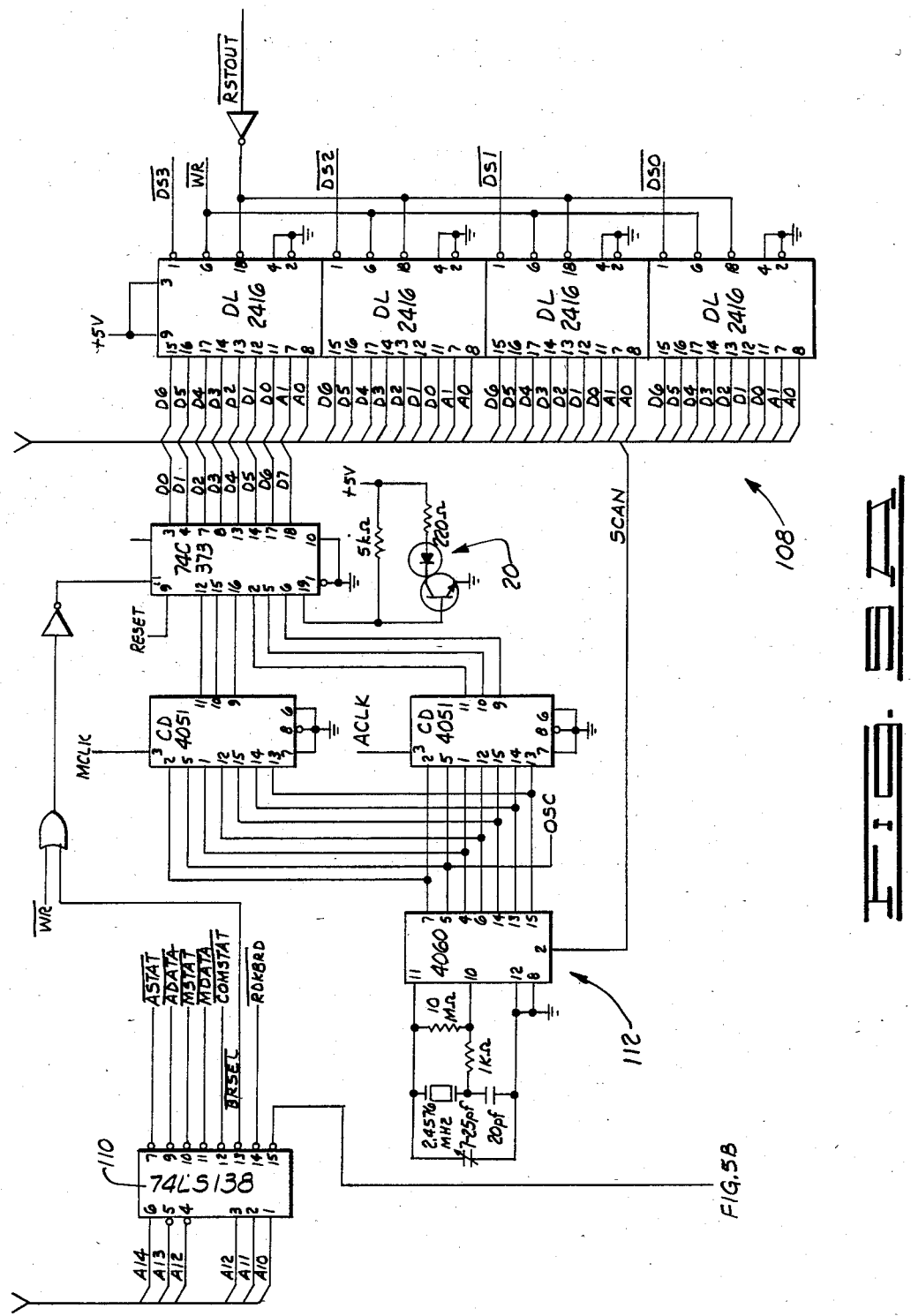
Figure 5B:
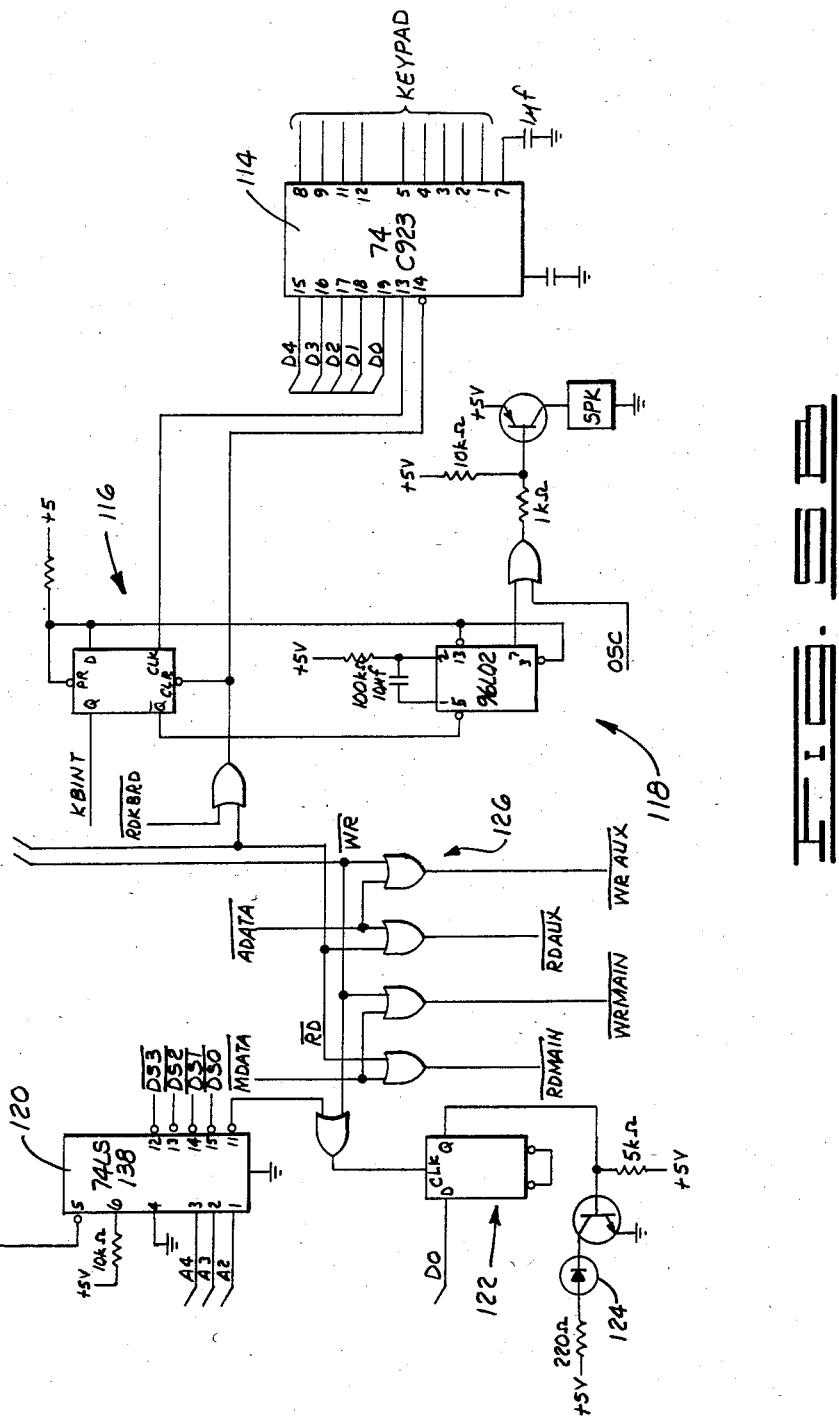

The "keypad interrupt" occurs when a key on the keypad 22 is depressed, at which time the key entry data are read from a keypad interface shown in FIG. 5B and saved in the random access memory 92 for use during the background processing mode.

The "power fail interrupt" occurs when a power failure has been detected. This interrupt updates a store counter maintained in the microcomputer of the CPU/memory card 48 and initiates a store pulse to the NOVRAM's 94–100, which store pulse causes the contents of the volatile portion of the NOVRAM's to be stored in the non-volatile portion thereof. If the power returns to normal for a 250 millisecond duration, processing is restarted by branching to address zero.

Due to the critical voltage levels required by the NOVRAM's 94–100 to complete a successful data store, processing with the interrupts disabled is optimized to minimize the length and number of such intervals. Normally, the store pulse is generated within 150 to 250 microseconds from the time the power failure is detected.

The "3.33 millisecond interrupt" occurs every 3.33 milliseconds and is driven from the divider for a baud rate generator circuit of the I/O display card 50 described hereinbelow with reference to FIG. 5A. A counter of the microcomputer of the CPU/memory card 48 counts twenty-five interrupts to time intervals of 83.333 milliseconds. Most of the 83.333 millisecond processing is done with the interrupts enabled.

The microcomputer of the CPU/memory card 48 maintains two tables, RCNTS and TCNTS, which are updated each of the 83.333 millisecond intervals. These tables contain the counts used for calculating the flow rates and for accumulating pulses for the total volumes. Table TCNTS contains both the count of the 8-bit counter last read from a totalizer card and a 16-bit total of the counts for each channel. Table RCNTS contains ten 16-bit counters for each channel, which counters contain the number of pulses for the current 3.75 second interval plus a history of the counts for the previous nine 3.75 second intervals.

Because the 8-bit counters of the totalizer cards are polled every 83.333 milliseconds, the maximum input frequency for any input channel is 3,060 hertz. Occasional pulses may be lost by a totalizer card due to interrupt processing for frequencies greater than 2,450 hertz (assuming a 50% duty cycle for the conditioned input signal). The maximum output frequency for a flow meter such as a one-half inch Halliburton Services water flood turbine flow meter is 1625 hertz; therefore, no pulses will be lost as long as the duty cycle is in the 33% to 67% range.

The "system reset interrupt" occurs when a system reset switch (see FIG. 4A) on the CPU/memory card 48 is actuated. This interrupt provides a way to restart the processing without generating a "recall" (reloading of the volatile storage of the NOVRAM's 94–100 with data from the non-volatile storage) pulse to the NOVRAM's 94–100.

FIGS. 4A and 4B disclose additional elements contained on the CPU/memory card 48 in association with the microprocessor 76. In FIG. 4A there is shown power fail detector means 102 for detecting when power applied to the apparatus 2 is interrupted. The operation of the power fail detector means 102 initiates the power fail interrupt procedure controlled by the interrupt processing mode of the CPU/memory card 48 operating system. The circuit 102 operates by detecting when a voltage applied to the apparatus 2 falls below a predetermined level.

FIGS. 4A and 4B further disclose a power application detection circuit 104 which generates a recall signal for use by the NOVRAM's 94–100 in reloading into its volatile memory area data from its non-volatile memory area when the apparatus 2 is initially turned on by means of the power switch 16 or when power is returned after a power interruption or outage. This means prevents the information stored in the non-volatile memory chips from being erased when power is applied or reapplied to the apparatus 2. The preferred embodiment detector circuit 104 is responsive to the sensed voltage being above a predetermined level.

FIG. 4A also discloses a manual system restart means 106, including the schematically illustrated manual system reset switch, for restarting the processing of the microprocessor 76 without generating a recall signal to the NOVRAM's 94–100 and thereby not altering the volatile section of the NOVRAM's with the previously stored contents of the non-volatile section of the NOVRAM's.

Figure 5C:
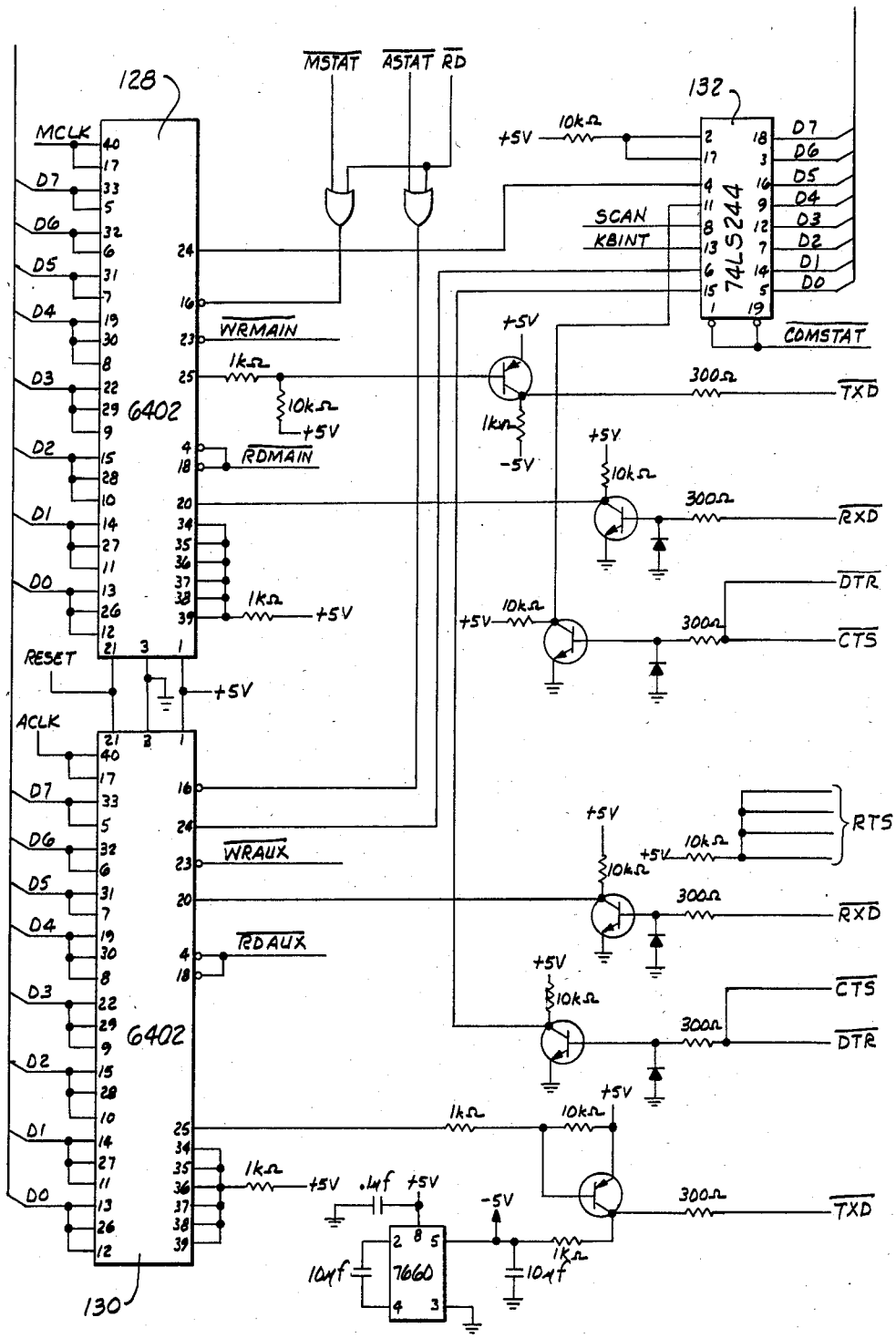

With reference to FIGS. 5A–5C, and I/O display card 50 will be described. FIG. 5A discloses four integrated circuit chips 108 constituting the display readout 18. Also shown in FIG. 5A is a demultiplexer chip 110 which functions as an address decoder to provide the specified control signals at its outputs.

A baud rate generator circuit 112 is also shown in FIG. 5A. The circuit 112 provides a 3.33 millisecond timer means for assisting in the calculations of the flow rates and time of day. FIG. 5A also illustrates the light-emitting diode 20 of the power fail indicator which is visible from the front panel 8 of the housing 4.

FIG. 5B discloses the circuitry for interfacing the keypad 22. This circuitry particularly includes a keypad interface chip 114, a keypad interrupt circuit 116 for generating a signal which initiates the keypad interrupt processing, and an audible indicator circuit 118 for generating an audible tone when a key of the keypad 22 is depressed.

FIG. 5B further discloses a demultiplexer chip 120 which functions as an address decoder for providing chip select signals to the display chips 108.

A NOVRAM fault indicator circuit 122 including a light-emitting diode 124 is also shown in FIG. 5B. The circuit 122 illuminates the LED 124 when a fault in the NOVRAM's 94–100 is detected.

FIG. 5B still further discloses circuitry 126 for providing read and write control signals to a main serial communication port and an auxiliary serial communication port shown in FIG. 5C.

The main serial communication port shown in FIG. 5C includes a first univeral synchronous/asynchronous receiver/transmitter (USART) chip 128. The auxiliary serial communication port includes a second universal synchronous/asynchronous receiver/ transmitter chip 130. These two ports provide two full duplex RS-232 compatible ports for connecting with external computers, CRT's, printers, or modems, for example.

In the preferred embodiment, one or two CRT's may be used with the apparatus 2. If one CRT is used it should normally be connected to the main communication port; however, the auxiliary communication port may also be used if no printer is connected thereto. If a printer is used it is to be connected only to the auxiliary communication port in the preferred embodiment. Printer output can be obtained on demand by depressing the print key 42. The preferred embodiment of the apparatus 2 can also be initialized to provide automatic printouts periodically from one to 250 times per day. If the automatic printout function is active when a power failure occurs, a printout will be initiated thirty seconds after power is re-established.

A status latch 132 is also illustrated in FIG. 5C

The utilization of the present invention is controlled by operator manipulation of the power switch 16 and the keypad 22. To energize the apparatus 2, the power switch 16 is actuated. Once the apparatus 2 is energized, subsequent controls are made via the keys of the keypad 22.

The display 18 is operated in a rippling decimal point mode by the background processing mode of the microcomputer of the CPU/memory card 48 to display a rippling decimal point when no keypad entry has been made for a preset length of time. Each time the decimal point moves one position (each 83.333 milliseconds), all of the 8-bit counters of the totalizer cards have been polled and all the 16-bit rate and total counters of the CPU/memory card microcomputer updated.

To display the rate and total for a particular channel, the channel number (01 through 48 if all four totalizer cards 44a-44d are used) is first entered. After the second digit has been entered, a rate, total or meter calibration factor is displayed. With each actuation of the rate/total key 28, the CPU/ memory card microcomputer controls the display 18 to alternately show the rate and total for the selected channel. Displayed rates and totals are preceded by the channel number and rates are succeeded with the time base of units per minute, per hour, or per day. To display the rate in a different time base, the minute/hour/day key 30 is depressed.

To display the sum of rates and sum of totals, the operator actuates the sum key 32 to generate a sum select signal that causes the CPU/memory card microcomputer to compute the sums and to display one of them (e.g., the sum of the current flow rates for all the monitored flow meters). To display the other sum (e.g., the sum of the total volumes for all the monitored flow meters), the rate/total key 28 is actuated. Successive actuations of the rate/total key 28 cause alternate displays of the sum of rates and the sum of totals. If an asterisk appears in the display, a channel has been excluded from the sums because of an overflow of a flow rate or because of a channel having been selected for exclusion.

If the operator desires the current date and time to be displayed via the readout 18, he or she actuates the date key 34. If the apparatus 2 is connected to a printer, a summary of all channels can be printed by depressing the print key 42.

To step through the rate or total for all channels, the starting channel number is first entered and either the rate or total mode selected via the key 28. To examine higher numbered channels, the increment key 24 is depressed; to examine lower numbered channels, the decrement key 26 is depressed.

The function key 36, the enter key 38 and the return key 40 are used by the operator to enter special function codes described in the table hereinbelow. To enter a special function code, the function key 36 is first depressed and then a correct one to seven digit pass code number must be entered via the numerical keys of the keypad 22. Only two pass code numbers are valid, a user selectable pass code number and a system generated number based on the date and time. Once a valid pass code number has been entered via the numerical keys and the enter key 38, the special functions can be entered without re-entering the pass code number until a software-maintained display timer expires. Once a special function code number has been keyed in, the enter key 38 is actuated; parameter setting specific information, if any, is thereafter keyed in and entered. If a function code has been selected in error, the return key 40 is actuated. The special functions are used for entering calibration data (e.g., meter divisors, date/time), for configuring the apparatus 2 (e.g., baud rates, display timer, CRT cursor control, number of channels, number of fraction digits for totals, printer output format, printer line feed option, master meter channel exclusion, period for automatic printing), for controlling (e.g., resetting individual or all totals, turning off the power fail indicator), and for displaying (e.g., meter calibration factors, store counter, memory contents, version identifier).

| SPECIAL FUNCTION CODE TABLE | |
|---|---|
| Special Function Code No. | Description |
| 1 | Set date and time - Prompts for the month, day, hour, minute and second to set the time of day clock. |
| 2 | Set divisor for a channel - Prompts for the channel number and meter divisor. |
| 3 | Select baud rate for Main Serial Communication Port - Allows selection of the baud rate by use of increment/decrement or numeric key entry. |
| 4 | Select baud rate for Auxiliary Serial Communication Port - Allows selection of the baud rate by use of increment/decrement or numeric key entry. |
| 5 | Reset power fail indicator - Turns the latched power fail indicator off. |
| 6 | Zero total for a channel - Prompts for the channel number of the total to be zeroed when the enter key is depressed. |
| 7 | Zero totals for all channels - The totals for all channels are zeroed when the enter key is depressed. |
| 8 | Set display timer - Allows entry of the number of seconds (5-250) the display continues displaying data after the last key is depressed. |
| 9 | Change pass code number - A new user pass code number (0-9,999,999) may be entered. |
| 10 | Display memory location - The address of a memory location (0-28,671) may be entered in decimal and the address and contents are then displayed in hexadecimal. The increment and decrement keys may be used to display consecutive locations. |
| 11 | Change cursor home sequence for CRT - A 3-byte sequence for cursor home may be entered by keying in the decimal equivalent of the sequence. |
| 12 | Change page or screen erase sequence for CRT - A 3-byte sequence for page or screen erase may be entered by keying in the decimal equivalent of the sequence. |
| 13 | Set number of channels - The number of channels (1-48) available for display may be entered. |
| 14 | Set number of fractional digits for totals - The number of fractional |

SPECIAL FUNCTION CODE TABLE
-continued

| Special Function Code No. | Description |
|---|---|
| | digits (0–2) shown with a total may be entered. |
| 15 | Select printer output format - The format desired for printer output may be selected. |
| 16 | Select line feed option - Allows selection of whether a line feed is required with each carriage return. |
| 17 | Select channel number for exclusion - Allows selection of a single channel to be excluded from the sum of rates and sum of totals. |
| 18 | Select the number of automatic print-outs per day - Allows entry of the number of automatic print-outs to occur each day (0–250). |
| 19 | Display version - The 4-character version identifier in the main operating system is displayed. |
| 20 | Select display of meter divisor - Allows the displaying of a channel's divisor instead of a rate or a total. Use of the increment or decrement keys or a 2-digit channel number entry will display the divisor until the rate/total key is depressed. |
| 21 | Display store counter - The number of store pulses (power fails) sent to the NOVRAM is displayed. |

In summary, while the apparatus 2 is operating to continually update the flow meter information, it conditions each electrical signal received through the flow meter channels into a corresponding digital signal having a number of pulses proportional to the respective electrical signal and, therefore, proportional to the flow rate detected by the flow meter. The pulses are electrically counted or accumulated by the microcomputer 62 of the respective totalizer card. The accumulated count is stored within a respective one of the 8-bit counters of the microcomputer 62.

Periodically, the microcomputer of the CPU/memory card 48 sends an interrupt signal to the microcomputer 62 and designates a particular channel whose stored count is to be transferred to the microprocessor 76. The most recent count transferred from the microcomputer 62 to the microprocessor 76 is contained in one of the 8-bit memory registers of the CPU/memory card 48 and an updated total of the instantaneous counts for that channel is maintained in one of the 16-bit counters.

With this information stored in the microcomputer of the CPU/memory card 48, the microprocessor 76 is able to compute the individual flow rate for each channel, the total volume for each channel and the sums of the individual flow rates and total volumes for all the channels. Upon appropriate command from the keypad 22, the microprocessor 76 will cause the selected information to be displayed via the readout 18.

In the event of a power interruption or outage, the circuit 102 shown in FIG. 4A interrupts the microprocessor 76 which thereupon initiates a store command to provide non-volatile storage of the flow rate data and special function variables contained in the volatile portion of the NOVRAM's 94–100. Power reapplication to the apparatus 2 is detected by the circuit 104, whereby a recall signal is applied to the NOVRAM's 94–100 to insure that the contents for the volatile portion thereof are refreshed from the non-volatile portion for further use.

If it is desired to restart the program in the microprocessor 76 without destroying current data in the volatile storage of the NOVRAM's, the manual reset switch of the circuit 106 is manually actuated to restart the microprocessor 76 without generating a recall pulse to the NOVRAM's 94–100, thereby preventing the NOVRAM's 94–100 from recalling old data.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims. In particular, the specific component numbers and values shown in the drawings are not to be taken as limiting the scope of the present invention.

What is claimed is:

1. An apparatus for monitoring a plurality of flow meters providing respective electrical signal proportional to the flow rates of substances flowing past said flow meters, said apparatus comprising:

receiver means for receiving said respective electrical signals in respective channels, each of said channels having means for connecting with one of said flow meters, and for conditioning said electrical signals into corresponding digital signals having numbers of pulses proportional to said flow rates, said receiver means including data selector means, having a first plurality of inputs and a second plurality of inputs and a plurality of outputs, for connecting either said first plurality of inputs or said second plurality of inputs to said plurality of outputs, said first plurality of inputs being connected to a first group of said channels and said second plurality of inputs being connected to a second group of said channels;

counter means, having a plurality of storage locations, for repeatedly polling said channels and for counting and storing in respective ones of said plurality of storage locations the counts of pulses of said digital signals detected in each of said channels during the last one of the pollings, said counter means including first microcomputer means, having a plurality of inputs connected to said plurality of outputs of said data selector means, for controlling said data selector means to periodically connect said first plurality of inputs of said data selector means to said plurality of outputs and to periodically connect said second plurality of inputs of said data selector means to said plurality of outputs;

calculator means, responsive to the counts contained in said storage locations, for determining for each channel individual flow rates of said substances at the time said counter means last polled said receiver means and for determining for each channel the total volumes of said substances for a time prior to and including the time said counter means last polled said receiver means and for determining the sum of said individual flow rates and the sum of said total volumes, said calculator means including second microcomputer means for periodically interrupting, for a predetermined time period, said first microcomputer means from controlling said data selector means and for causing said first microcomputer means during said predetermined time period to transfer the stored contents of said storage locations to said second microcomputer means;

volatile memory means for retaining said individual flow rates, said total volumes, said sum of individual flow rates, and said sum of total volumes; and means, connected with said calculator means and said volatile memory means, for displaying said individual flow rates, said total volumes, said sum of individual rates, and said sum of total volumes.

2. An apparatus for monitoring a plurality of flow meters, each of which flow meters provides an electrical signal proportional to a flow rate detected thereby, said apparatus comprising:

receiver means, having a plurality of channels, for receiving each said electrical signal through a respective one of said channels;

first microcomputer means, responsive to each said electrical signal and having a plurality of counters, for repeatedly polling each of said channels and storing in a respective one of said counters a count proportional to said electrical signal of a respective one of said channels at the time said polling occurs;

display means for displaying information provided thereto;

first switch means for providing rate/total select signals;

second switch means for providing a units select signal;

third switch means for providing a sum select signal; and second microcomputer means, responsive to each of said counts stored in said counters, for determining the individual flow rate of each respective flow meter for the last polling of the channel receiving the electrical signal from the respective flow meter, the total flow of each said flow meter for all of said repeated pollings, the sum of said individual flow rates, and the sum of said total flows, said second microcomputer means including:

means, responsive to two successive ones of said rate/total select signals, for causing said display means to display an individual flow rate for one of said flow meters and to subsequently display a total flow for said one of said flow meters;

means, responsive to said units select signal, for changing the time base of a rate being displayed; and means responsive to said sum select signal and two successive ones of said rate/total select signals, for causing said display means to successively display said sum of individual flow rates and said sum of total flows.

3. An apparatus as defined in claim 2, wherein: said apparatus further comprises:

power fail detector means for detecting when a voltage applied to said apparatus falls below a predetermined level; and power application detector means for detecting when a voltage above a predetermined value is applied to said apparatus; and said second microcomputer means further includes:

first memory means for retaining said determined individual flow rates and total flows when voltage is applied to said apparatus;

second memory means for storing information;

means, responsive to said power fail detector means, for storing in said second memory means the individual flow rates and total flows within said first memory means; and means, responsive to said power application detector means, for maintaining said individual flow rates and said total flows stored in said second memory means after voltage is reapplied to said apparatus.

4. The apparatus as claimed in claim 3, further comprising means for restarting said second microcomputer means without recalling into said first memory means the stored contents of said second memory means.

5. An apparatus for monitoring a plurality of flow meters at a well site, said flow meters providing respective electrical signals proportional to the flow rates of substances flowing past said flow meters, said apparatus comprising:

a portable housing adapted for use at said well site;

a plurality of data concentrator means, contained within said housing, for polling said flow meters, each of said data concentrator means including:

receiver means for receiving a respective number of the respective electrical signals in respective channels, each of said channels connectible with a respective one of the flow meters, and for conditioning said electrical signals into corresponding digital signals having numbers of pulses proportional to the respective flow rates; and counter means, having a plurality of storage locations, for repeatedly polling said channels and for counting and storing in respective ones of said plurality of storage locations the counts of pulses of said digital signals detected in each of said channels during the last one of the pollings;

one, and only one, central processing means, contained within said housing, for obtaining said counts from said storage locations and for determining therefrom for each channel individual flow rates of the substances and for determining for each channel the total volumes of the substances flowing past said flow meters and for determining the sum of said individual flow rates and the sum of said total volumes; and display means, mounted on said housing and connected with said one and only one central processing means, for displaying said individual flow rates, said total volumes, said sum of individual flow rates, and said sum of total volumes.

6. An apparatus as defined in claim 5, wherein: each said receiver means includes:

twelve differential amplifier means for converting analog signals into digital signals, each of said differential amplifier means defining at least part of a respective one of said channels;

interface means for connecting a respective one of said flow meters to a respective one of said differential amplifier means; and data selector means, having a first group of six inputs connected to a respective six of said differential amplifier means and having a second group of six inputs connected to the remaining six differential amplifier means and having a group of six outputs, for connecting a selectable one of said first group of six inputs and said second group of six inputs to said group of six outputs; and each said counter means includes one, and only one, microcomputer connected to said group of six qutputs, and having means for generating a data select signal connected to data selector means and further having means for counting the pulses transmitted over said group of six outputs and for storing the counts of pulses for each channel in respective memory locations within said microcomputer so that counts for up to a respective twelve flow meters are retained within each said microcomputer.

* * * * *

UNITED STATES PATENT AND TRADEMARK OFFICE
CERTIFICATE OF CORRECTION

PATENT NO. : 4,593,365

DATED : June 3, 1986

INVENTOR(S) : Haley, Jr. et al.

It is certified that error appears in the above-identified patent and that said Letters Patent is hereby corrected as shown below:

In column 7, line 21, delete the word [enables] and insert therefor --enabled--.
In column 7, line 47, delete the word [divlsor] and insert therefor --divisor--.
In column 11, line 7, delete the word [illustrated] and insert therefor --illustrated--.
In column 11, line 7, following the words "FIG. 5C" insert --.--.
In column 14, line 24, delete the word [signal] and insert therefor --signals--.
In column 16, line 10, delete the word [The] and insert therefor --An--.

Signed and Sealed this

Third Day of February, 1987

Attest:

DONALD J. QUIGG

*Attesting Officer*  *Commissioner of Patents and Trademarks*